US011157242B2

(12) United States Patent
Gray et al.

(10) Patent No.: US 11,157,242 B2
(45) Date of Patent: Oct. 26, 2021

(54) SYSTEMS, METHODS, AND APPARATUSES FOR LOCAL WEB COMPONENTS DEVELOPMENT WITHIN A CLOUD BASED COMPUTING ENVIRONMENT

(71) Applicant: salesforce.com, inc., San Francisco, CA (US)

(72) Inventors: Kristopher Scott Gray, Redmond, WA (US); Nicolas Raymond Kruk, Durham, NC (US); Nathan David McWilliams, Sandy Springs, GA (US); Nathan Joseph Totten, Fort Mill, SC (US); Mindaugas Andrius Idzelis, Raleigh, NC (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/879,377

(22) Filed: May 20, 2020

(65) Prior Publication Data
US 2021/0096825 A1 Apr. 1, 2021

Related U.S. Application Data

(60) Provisional application No. 62/908,491, filed on Sep. 30, 2019.

(51) Int. Cl.
*G06F 16/95* (2019.01)
*G06F 8/30* (2018.01)
(Continued)

(52) U.S. Cl.
CPC .............. *G06F 8/30* (2013.01); *H04L 63/083* (2013.01); *H04L 67/02* (2013.01); *H04L 67/10* (2013.01)

(58) Field of Classification Search
None
See application file for complete search history.

(56) References Cited

U.S. PATENT DOCUMENTS

| 6,622,168 B1* | 9/2003 | Datta ..................... H04L 29/06 709/219 |
| 8,775,550 B2* | 7/2014 | Jeyaseelan .......... H04L 67/2842 709/217 |

(Continued)

*Primary Examiner* — Quang N Nguyen
(74) *Attorney, Agent, or Firm* — Elliot, Ostrander & Preston, P.C.

(57) ABSTRACT

Resolving a dynamic request from a local web component rendered on a development server executing on a user client device. A cache is located in the user client device and is accessible to the development server. The development server receives a first request for information from the local web component via a web browser, intercepts the first request at a proxy override module and transmits the first request to a cloud computing service provider's server. The development server receives a response from the cloud computing service provider's server in reply to the first request, transmits the response from the development server to the local web component, stores in the cache the response received at the development server from the cloud computing service provider's server in reply to the first request for information. The development server receives a subsequent request for the information from the local web component via the web browser, accesses the response to the subsequent request from the cache, and transmits the response accessed from the cache to the local web component.

14 Claims, 20 Drawing Sheets

(51) Int. Cl.
  *H04L 29/08* (2006.01)
  *H04L 29/06* (2006.01)

(56) References Cited

U.S. PATENT DOCUMENTS

| | | | |
|---|---|---|---|
| 10,951,501 B1* | 3/2021 | Jones | H04L 43/0805 |
| 2005/0138176 A1* | 6/2005 | Singh | G06F 16/9574 |
| | | | 709/226 |
| 2008/0104195 A1* | 5/2008 | Hawkins | G06F 16/9574 |
| | | | 709/217 |
| 2015/0088969 A1* | 3/2015 | Wei | H04L 67/2823 |
| | | | 709/203 |
| 2015/0381701 A1* | 12/2015 | Reddy | G06F 16/9574 |
| | | | 709/217 |
| 2016/0255088 A1* | 9/2016 | Kaplan | H04L 63/08 |
| | | | 726/7 |

* cited by examiner

```
$ sfdx force:lightning:lwc:start sfdx force:lightning:lwc:start [--port <integer>] [--apiversion <string>]
[--json] [--loglevel
trace|debug|info|warn|error|fatal] USAGE
  $ sfdx force:lightning:lwc:start [--port <integer>] [--apiversion <string>]
[--json] [--loglevel
trace|debug|info|warn|error|fatal]

OPTIONS
  -p, --port=port number 8080)                    set the port for the dev server
  -u, --targetusername=targetusername             (defaults to
  overrides default target org                    username or alias for the
                                                  target org;
  -v, --
  targetdevhubusername=targetdevhubusernam        username or alias for the dev
  e overrides default dev hub org                 hub org; override the api
  --apiversion=apiversion requests made           version used for api format
  by this command                                 output as json
  --json                                          [default: warn] logging level
  --                                              for this
  loglevel=(trace|debug|info|warn|error|fa
  tal) command invocation EXAMPLES
  $ sfdx force:lightning:lwc:start
```

```
{
    // What namespace to use referencing your Lightning
    Web Components "namespace": "c", // Where are your component files. If you have a namespace,
    // specify the directory the namespace
    // folder is in. "moduleSourceDirectory":
    "....", // What container to preview your
    // components in "containerType": "....", // The address port for your local server.
    // Defaults to 3333 "port": 3333
}
```

```
const conn =
this.org.getConnection(); const
onProxyReq = function(
    proxyReq: http.ClientRequest,
    req: http.IncomingMessage,
    res: http.ServerResponse
) {
    proxyReq.setHeader('Authorization', `Bearer ${conn.accessToken}`);
};
```

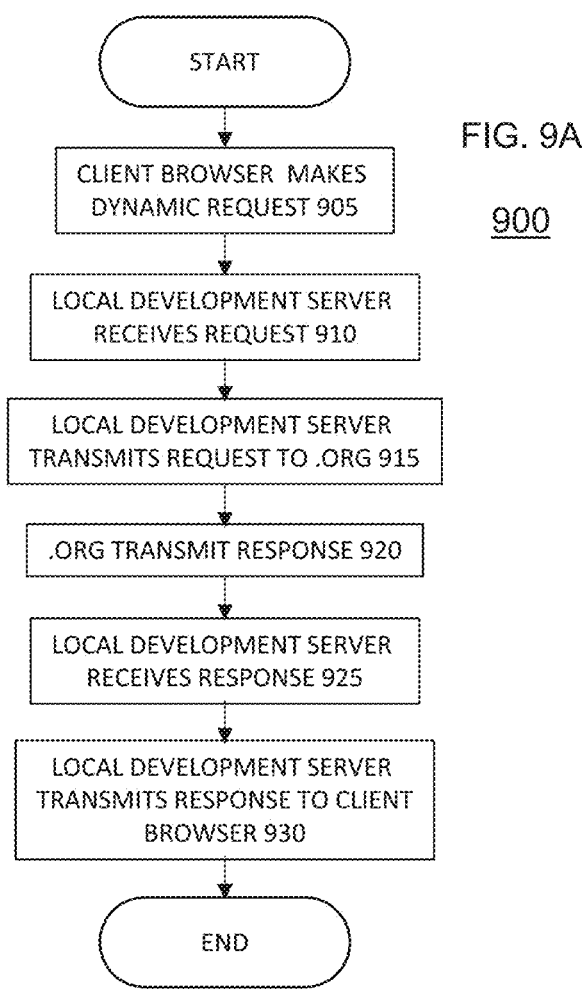

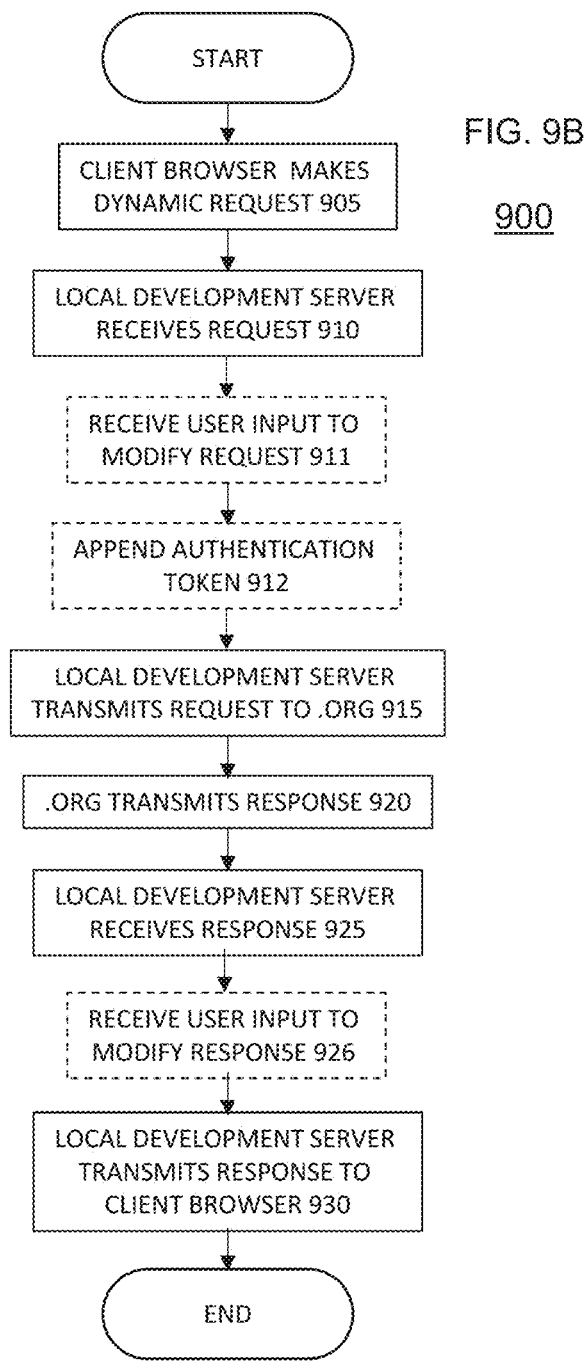

900

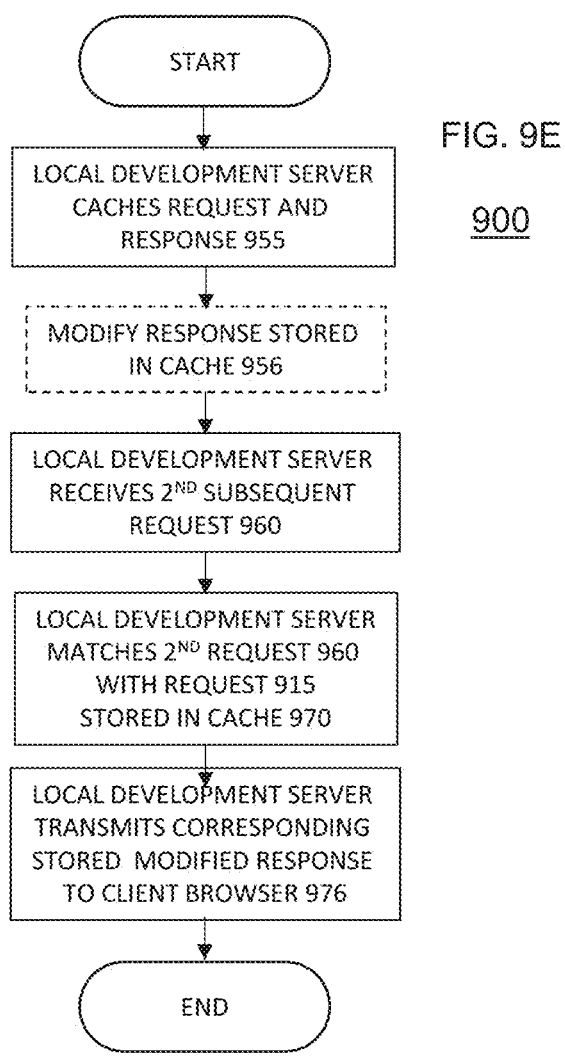

900

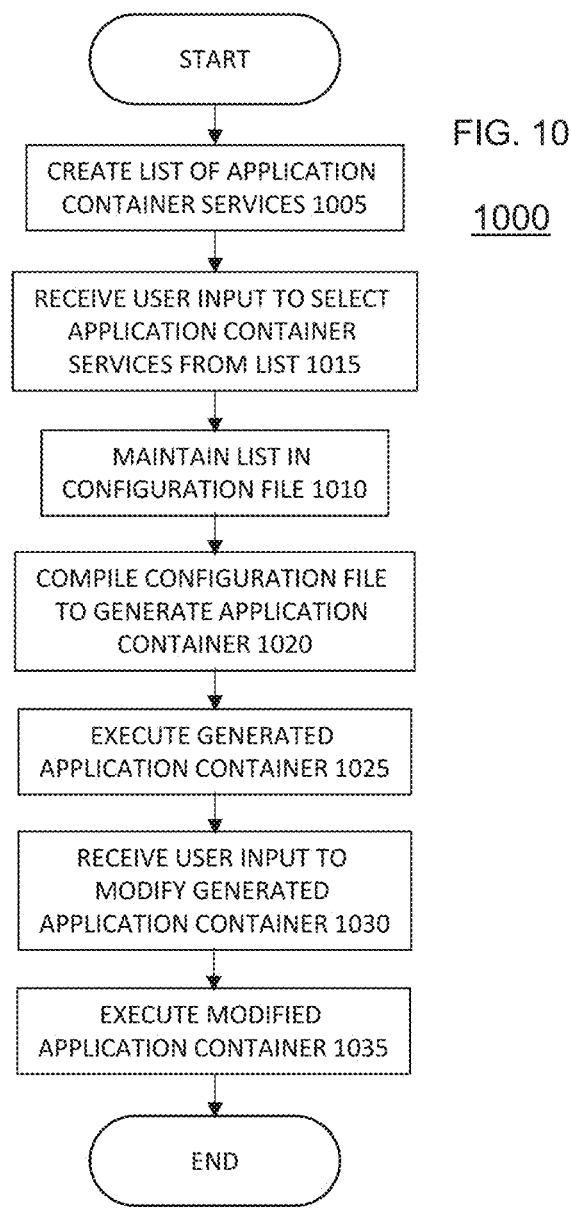

1100

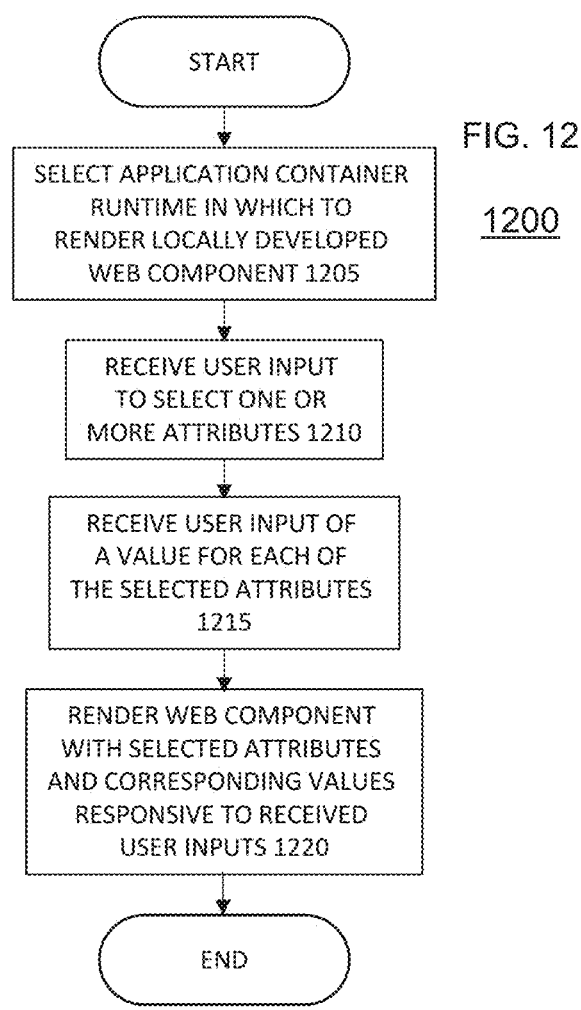

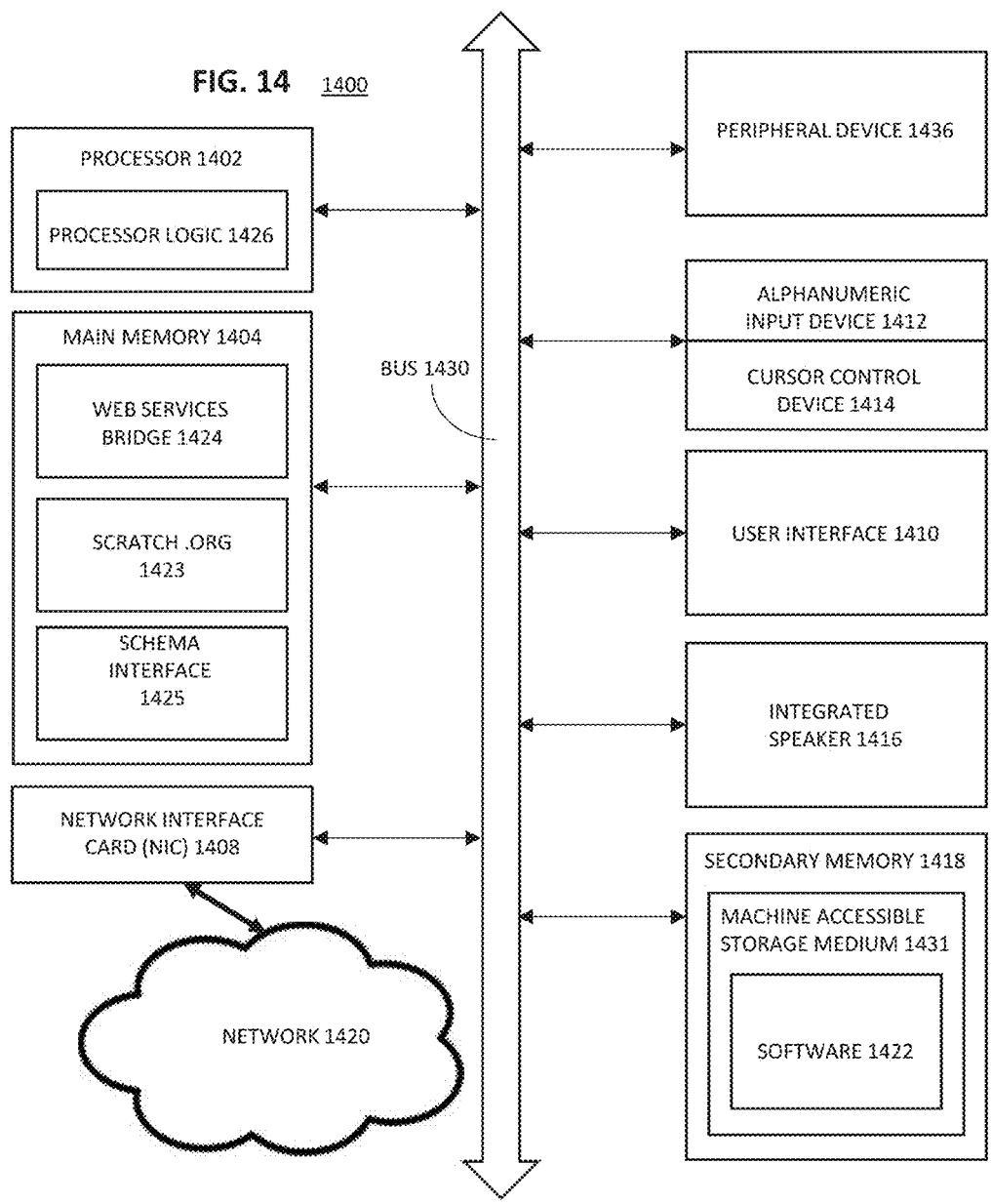

SYSTEMS, METHODS, AND APPARATUSES FOR LOCAL WEB COMPONENTS DEVELOPMENT WITHIN A CLOUD BASED COMPUTING ENVIRONMENT

CLAIM OF PRIORITY

This non-provisional U.S. Utility patent application is related to, and claims priority to, provisional patent application No. 62/908,491 filed Sep. 30, 2019, entitled "Systems, Methods, and Apparatuses for Local Web Components Development within a Cloud Based Computing Environment", the contents of which are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of computing, and more particularly, to systems, methods, and apparatuses for local development of web components within a cloud based computing environment. Such embodiments may be implemented within the computing architecture of a hosted computing environment, such as an on-demand or cloud-computing environment that utilizes multi-tenant database technologies, client-server technologies, traditional database technologies, or other computing architecture in support of the hosted computing environment.

BACKGROUND

The subject matter discussed in this background section should not necessarily be construed as prior art merely because of its mention in this section. Similarly, a problem mentioned in this section or associated with the subject matter of this section should not be construed as being previously recognized in the prior art. The subject matter in this section merely represents different approaches, which in and of themselves may also correspond to claimed embodiments.

When one creates web components within a cloud computing environment, or organization, those components get published to an organization. What is needed is a way to create web components for a community locally, or off-line, at a local development server, that is, a development server executing on a user client device, so that the components do not get published to an organization until a developer considers the web components ready for publication and use.

Systems, methods, and apparatuses for resolving requests from a local web component rendered on a development server will solve these problems.

BRIEF DESCRIPTION OF THE DRAWINGS

Embodiments are illustrated by way of example, and not by way of limitation, and will be more fully understood with reference to the following detailed description when considered in connection with the figures in which:

FIG. 3 depicts a command line interface in accordance with disclosed embodiments;

FIG. 4 is an example provisioning default configuration information in connection with disclosed embodiments;

FIG. 8 provides an example of retrieving an authentication token and appending it to a request in accordance with a particular embodiment;

FIG. 9A is a flow diagram depicting operations in accordance with a particular embodiment;

FIG. 9B is a flow diagram depicting operations in accordance with a particular embodiment;

FIG. 9E is a flow diagram depicting operations in accordance with a particular embodiment;

FIG. 10 is a flow diagram depicting operations for the creation of a template for possible application container services, maintained in a configuration file, in accordance with a particular embodiment;

FIG. 12 is a flow diagram depicting operations for selecting attributes, and providing values related thereto, relating to a locally developed web component at development time in order to properly render the web component, in accordance with a particular embodiment;

FIG. 14 illustrates a diagrammatic representation of a machine in the exemplary form of a computer system, in accordance with one embodiment.

DETAILED DESCRIPTION

Figure 1:
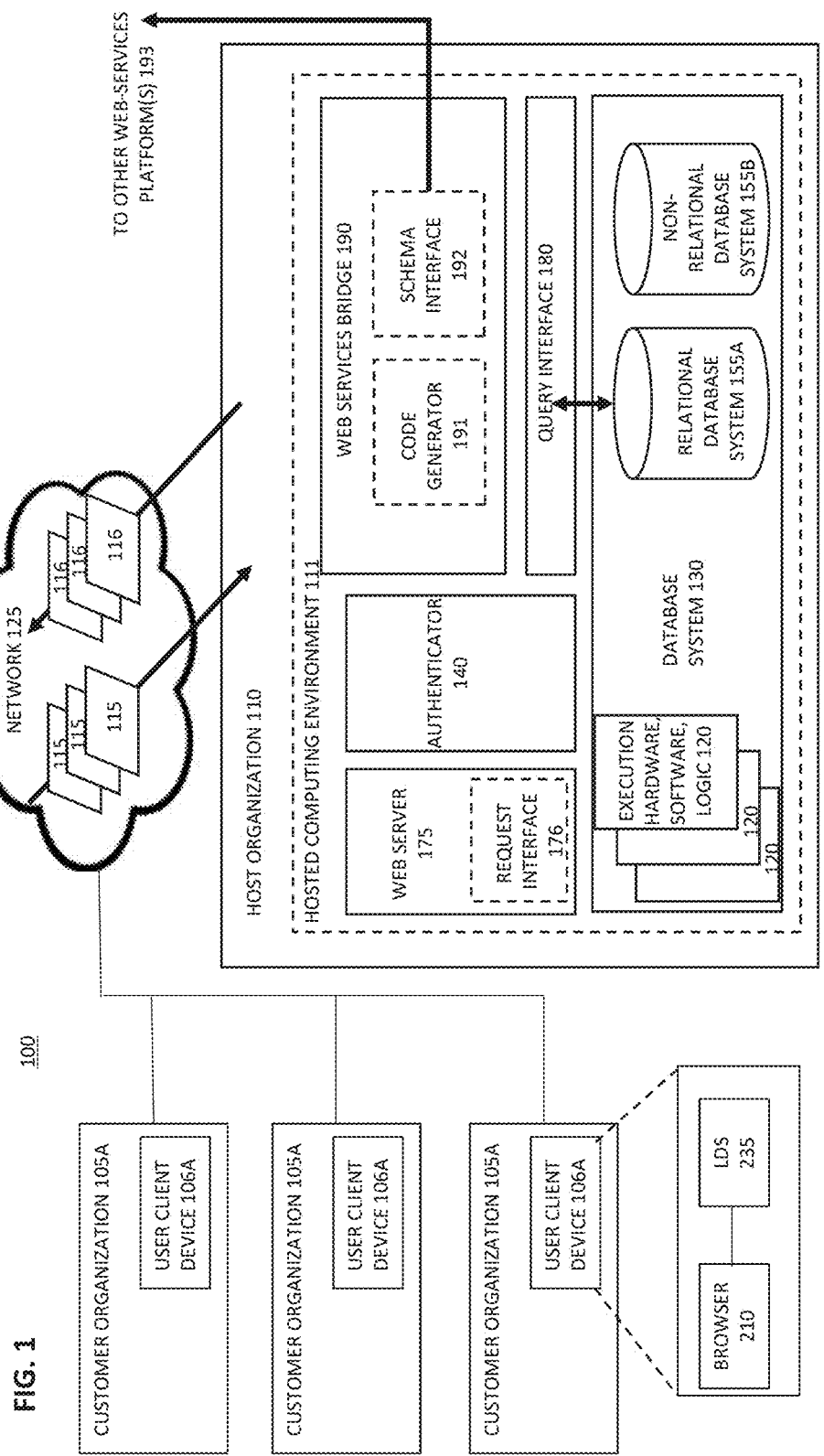
FIG. 1 depicts an exemplary architecture in accordance with described embodiments; 0

Described herein are systems, methods, and apparatuses for creating web components offline within a cloud based computing environment. For instance, such an exemplary system, having a processor and a memory therein, creates a web component using a local development server that can communicate with a cloud computing environment.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well-known materials or methods are described in detail in order to avoid unnecessarily obscuring the disclosed embodiments.

In addition to various hardware components depicted in the figures and described herein, embodiments further include various operations that are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated, configured, or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems appears as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other programmable electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary architecture 100 of a cloud computing environment in accordance with described embodiments. In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records with user data on behalf of client, or customer, organizations 105A-C, and communities 160A-C (e.g., users of such a database system 130 or tenants of a multi-tenant database type database system or the affiliated users of such a database system). Such databases include various database system types including, for example, a relational database system 155A and a non-relational database system 155B according to certain embodiments.

Certain embodiments may utilize a client-server computing architecture to supplement features, functionality, or computing resources for the database system 130 or alternatively, a computing grid, or a pool of work servers, or some combination of hosted computing architectures may be utilized to carry out the computational workload and processing demanded of the host organization 110 in conjunction with the database system 130.

The database system 130 depicted in the embodiment shown includes a plurality of underlying hardware, software, and logic elements 120 that implement database functionality and a code execution environment within the host organization 110.

In accordance with one embodiment, database system 130 utilizes the underlying database systems 155A and 155B to service database queries and other data interactions with the database system 130 that communicate with the database system 130 via the query interface. The hardware, software, and logic elements 120 of the database system 130 are separate and distinct from a plurality of customer organizations (105A, 105B, and 105C) which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

Further depicted is the host organization 110 receiving input and other requests 115 from a plurality of customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155A and 155B or the query interface 180, pursuant to which results 116 are then returned to an originator or requestor, such as a user of one of a user client device 106A-C at a respective customer organization 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user user client device 106A-C or machine originating such data requests 115.

The query interface 180 is capable of receiving and executing requested queries against the databases and storage components of the database system 130 so as to return a result set, response, or other requested data in furtherance of the methodologies described. The query interface 180 additionally provides functionality to pass queries from web-server 175 into the database system 130 for execution against the databases 155A and 155B for processing search queries, or into the other available data stores of the host organization's computing environment 111. In one embodiment, the query interface 180 implements an Application Programming Interface (API) through which queries may be executed against the databases 155A and 155B or the other data stores.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C. Authenticator 140 operates on behalf of the host organization to verify, authenticate, and otherwise credential users attempting to gain access to the host organization.

Still further depicted within the hosted computing environment 111 is the web-services bridge 190 having therein both a code generator 191 and also a schema interface 192 (also referred to as an inter-agent schema interface) capable of communicating with other web-services platform(s) 193 which regardless of whether such web-services environments are hosted by the same host organizations 110 or hosted by different host organizations.

Figure 2:
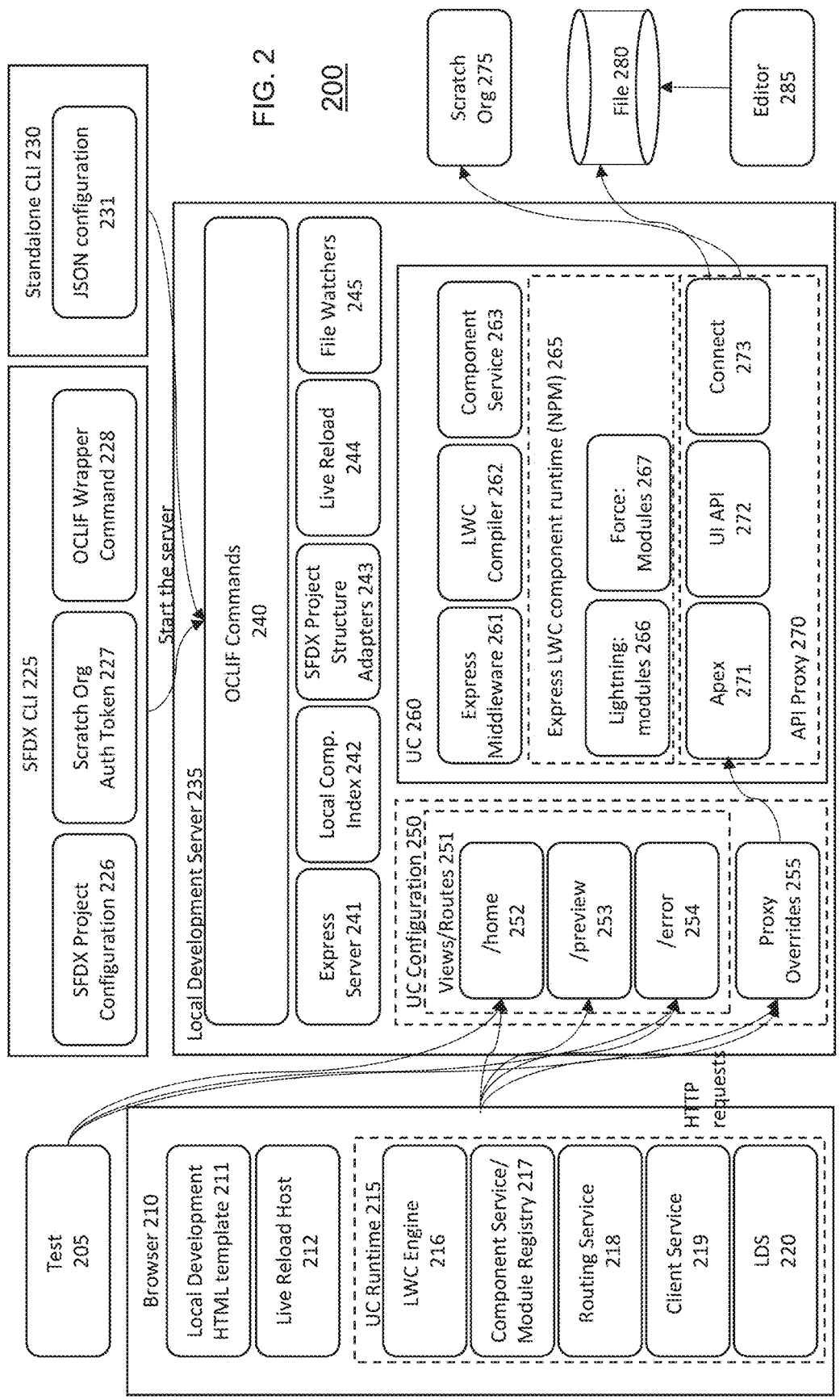
FIG. 2 depicts a functional block diagram for local development of web components in a cloud based computing environment in accordance with disclosed embodiments.

With reference to FIG. 2, embodiments of the invention 200 provide for a local, that is, off-line, software development environment that gives developers for cloud computing services provider customers the ability to locally run and develop web components on a user client device, for example, to locally run and develop Lightning Web Components (LWC) modules on the user client device, without publishing those components, for example, to an .org, until later, as desired by the developer or customer. LWC is a web components implementation available from Salesforce.com that substantially adheres to the World Wide Web Consortium (W3C) web components standard. Users can run a single Salesforce Developer Experience (SFDX) Command Line Interface (CLI) command 225 to start a local development server 235, which receives the OCLIF commands at 240, and uses express server 241, local comp. index 242, file watchers 245, compiles changes, and runs LWC modules in a client browser 210. The client browser 210 and the local development server 235 can both reside on a user client device 106 in a customer organization 105, as depicted for user client device 106C in FIG. 1. For web components that require data from a server endpoint (like Local Development Server (LDS) controllers or Apex controllers), the local development server 235 can intercept and proxy requests to a scratch .org 275 (using SFDX CLI authentication). Alternatively, the local development server 235 can also provide simple mock, or mock-up, data. The local development server 235 makes use of a Universal Container (UC) 260 and other services to provide the customer with the actual user interface (UI) that they will be using once the LWC modules are published to the customer's org.

The following terminology is referred to in the embodiments of the invention described herein:

Container—a generic, configurable application user interface (UI) shell with a composable set of backend and frontend services.

SDFX CLI/Salesforce Developer Experience Command Line Interface—Salesforce command line interface (e.g., //developer.salesforce.com/tools/sfdxcli).

UC/Universal Container—a container framework and runtime engine.

lwc-dev-server—with reference to FIG. 2, refers to the Express LWC component runtime (node package manager (NPM)) 265 for the local development server 235, and all the components therein, including, for example, Lightning and Force modules 266, 267. This package also provides a command of the same name to launch the local development server 235.

Embodiments of the invention utilize a universal container (UC) 260 that provides at least some of the following elements, depicted in FIG. 2:

a local development server 235 to serve compiled LWC components, a Salesforce Lightning Design System (SLDS) or the like, and other web resources;

a command line interface 225 or 230 to start the local development server 235;

a LWC compiler 262, including: support for LDS/@wire/SLDS/Lightning namespaced components; and module resolution for @salesforce dependencies (like labels);

component service 263;

a minimal set of routes/views 251, e.g.:

/home 252—an initial landing page where a developer can select a list of local LWC components to render; and /preview 253—a preview page which can dynamically load a just-in-time (JIT) compiled LWC component, and render it in a browser window;

express server 241;

local comp. index 242;

file watchers 245 (to provide Live Reload 244);

adapters 243 for SFDX project file structure;

API Proxy 270, including proxy Apex 271, UI API 272, and Connect 273 to forward requests to an org, including org authentication;

Actionable error reporting;

express middleware 261 for routing/views;

a dynamic runtime component registry 217; and proxy-to-org capability 270.

One embodiment provides a layer on top of the UC 260 so UC APIs are not directly exposed to end users. This allows use of the UC 260 without exposing APIs that are not finalized or ready for public consumption.

Embodiments of the invention support the following use cases for local LWC development:

Support for the SFDX CLI 225. The LWC local development server 235 may be packaged and distributed as an SFDX CLI 225 plugin. Users can execute a command to start the local development server 235 from their SFDX projects. Embodiments may further provide VSCode command integration such that users can, select, e.g., right click, on a file in VSCode and launch a preview of that component. VSCode refers to the Visual Studio Code, a source code editor developed by Microsoft Corporation.

Support for an LWC Open Source Software (OSS) Developer (Standalone CLI 230). Embodiments are primarily focused on the SFDX CLI 225 scenario, but embodiments may further provide the same set of capabilities to LWC OSS developers. Developers using LWC in a standalone capacity outside the Salesforce ecosystem may also be able to leverage local development without needing to install the SFDX CLI 225. In these scenarios, customers can globally install an NPM package, or use an Open CLI Framework (OCLIF) standalone installer, and run the local development server 235 with a command similar to the command used to run the SFDX CLI 225. In such a distribution format, embodiments honor an OSS spirit by having zero Salesforce specific dependencies (no Salesforce runtime, or SFDX CLI, prerequisites).

Support for the Salesforce Internal Developer. Embodiments may further provide the same set of capabilities to internal Salesforce developers, subject to differences to file structure and authentication.

With reference to FIG. 2, according to an embodiment of the invention 200, the local development server commands may be written using OCLIF wrapper command 228, the Salesforce-standard command line framework utilized by the SFDX CLI 225. This affords the ability to expose commands within the SFDX CLI 225, while also being able to support those same commands outside of the SFDX CLI for the LWC OSS use case.

According to one embodiment, customers will not be able to interact with the UC 260 directly, and will likely not even be aware of it. In such an embodiment, the features leveraged from the UC 260 are listed below:
  LWC Compiler 262;
  Express Middleware 261;
    Template
    Resource
    API
    Error
  Runtime 215: Module loader;
  SLDS, labels, internationalization, CSS variables;
  File watchers 245 (to provide Live Reload 244);
  Org API Proxy 270 for Apex 271 and UI API 272;

According to embodiment 300, as depicted in FIG. 3, the Command Line Interface, and in particular the SFDX CLI 225, provides a developer with the ability to run a sub-command bundled with the SFDX CLI to launch the local development server 235. This command starts the local development server, opens a browser 210 on it, and displays a landing page.

According to one embodiment, with regard to standalone CLI 230, the command lwc-dev-server is available once the NPM package is installed globally:
  $ yarn global add lwc-dev-server After installation, users can invoke the same sub-command used by the SFDX CLI 225:
  $ lwc-dev-server force:lightning:lwc:start While the code listed above for both commands is essentially the same, in an OSS scenario there is not a sfdx-project.json to provide default configuration information. With reference to FIG. 2, JSON configuration module 231, and FIG. 4, one embodiment 400 provides this same configuration capability via lwcdevserver.config.json, which can be inserted into the top level of any project. This configuration file can be used within SFDX projects as well to provide overrides for SFDX configuration values.

Figure 5:
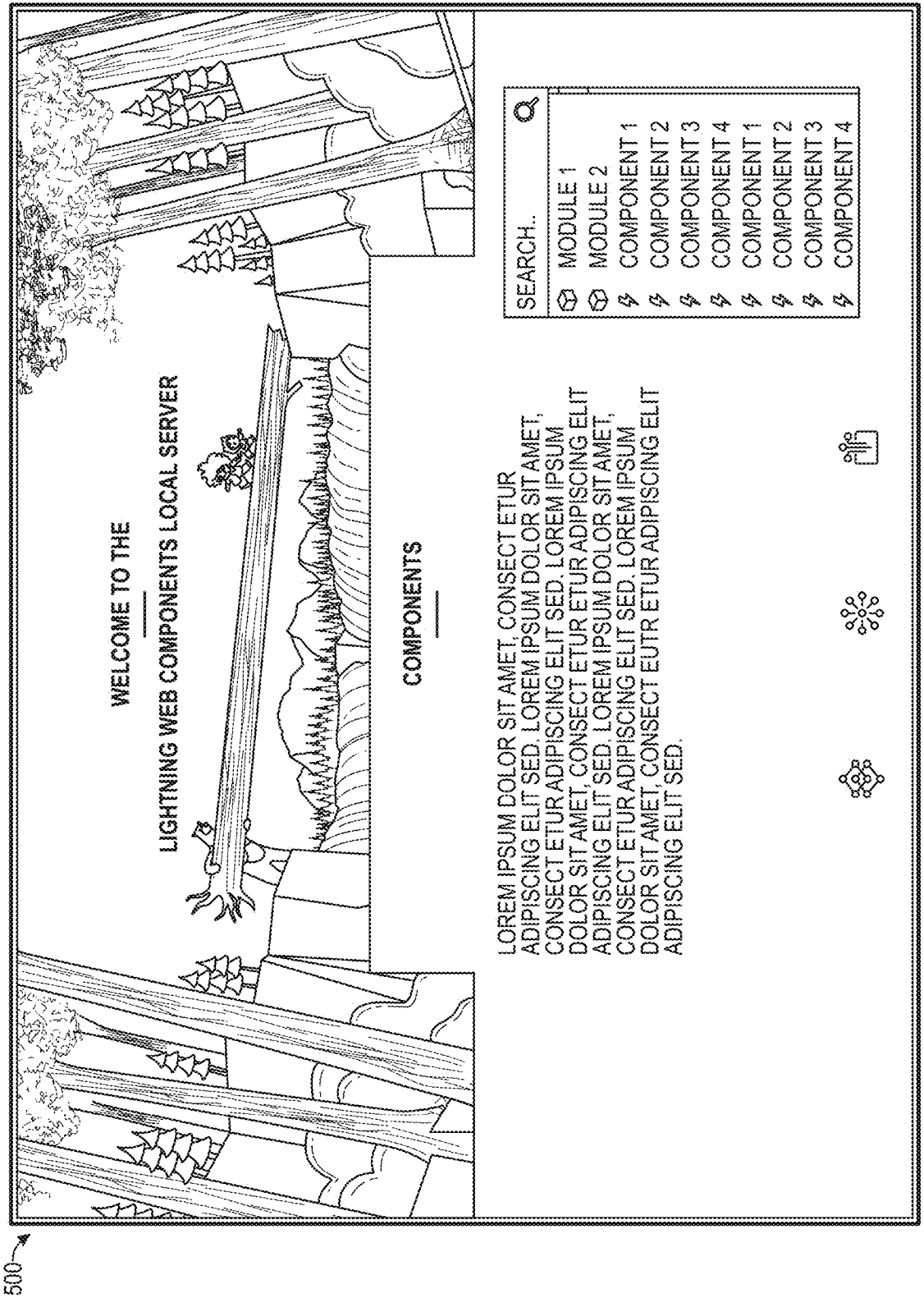
FIG. 5 depicts a component to support the local development server UI in connection with disclosed embodiments.

Embodiments of the invention provide components to support the local development server UI. One such component is Home 252, an example 500 of which is illustrated in FIG. 5. Home 252 is the initial landing page after starting the local development server 235, where users see a list of components that reside in their local project. Users can filter/select which component they wish to see rendered in their browser window.

Figure 6:
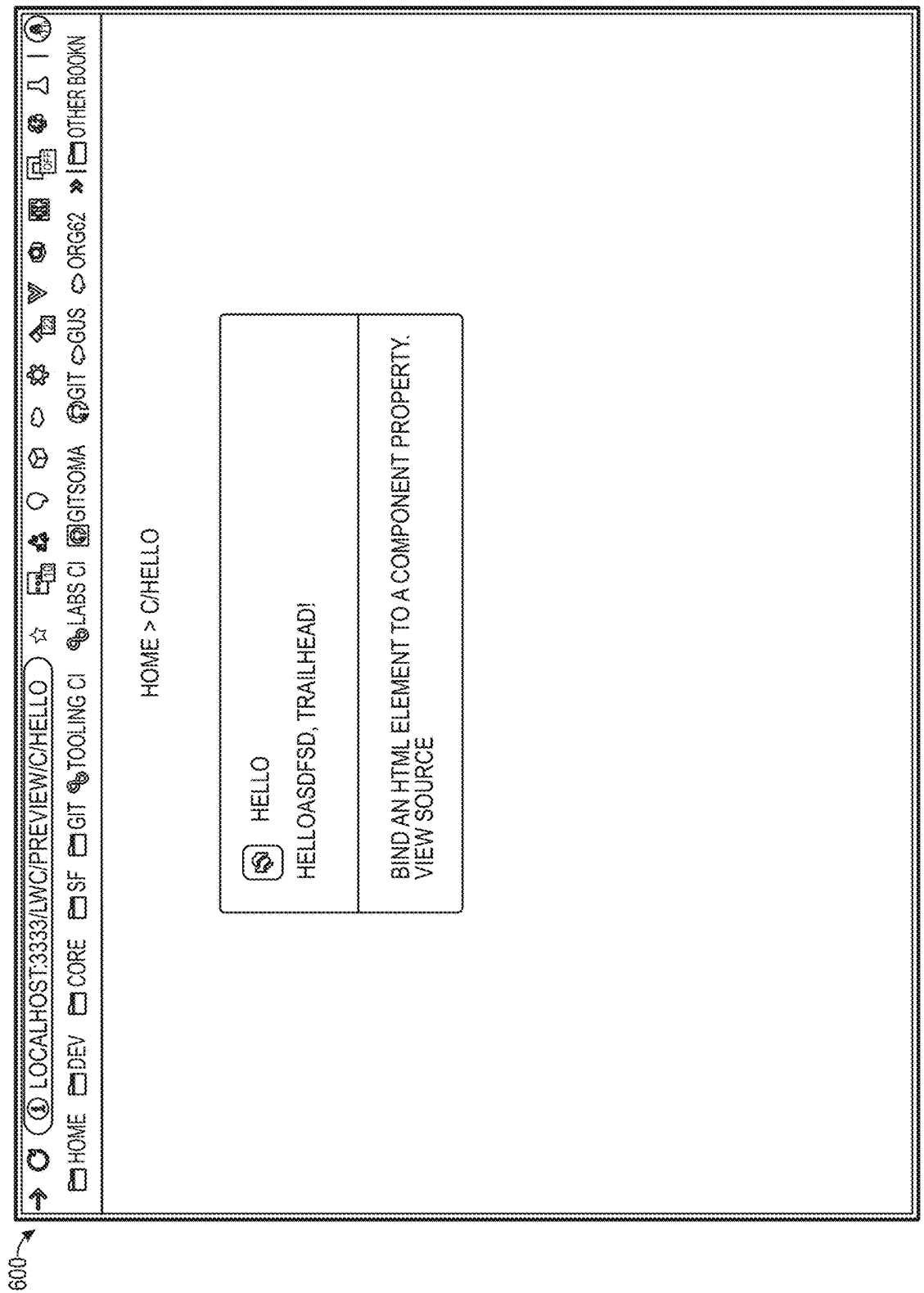
FIG. 6 depicts a component to support the local development server UI in connection with disclosed embodiments.

Another such component is Preview 253, an example 600 of which is illustrated in FIG. 6. Preview 253 is the host for a simple container that renders a component with no configuration of attributes or context. Further embodiments may include multiple containers to choose for component rendering, i.e., the LEX (one.app) look and feel, a container for flexipages, or a container that lets a developer choose languages, themes, or customize individual attributes.

Figure 7:
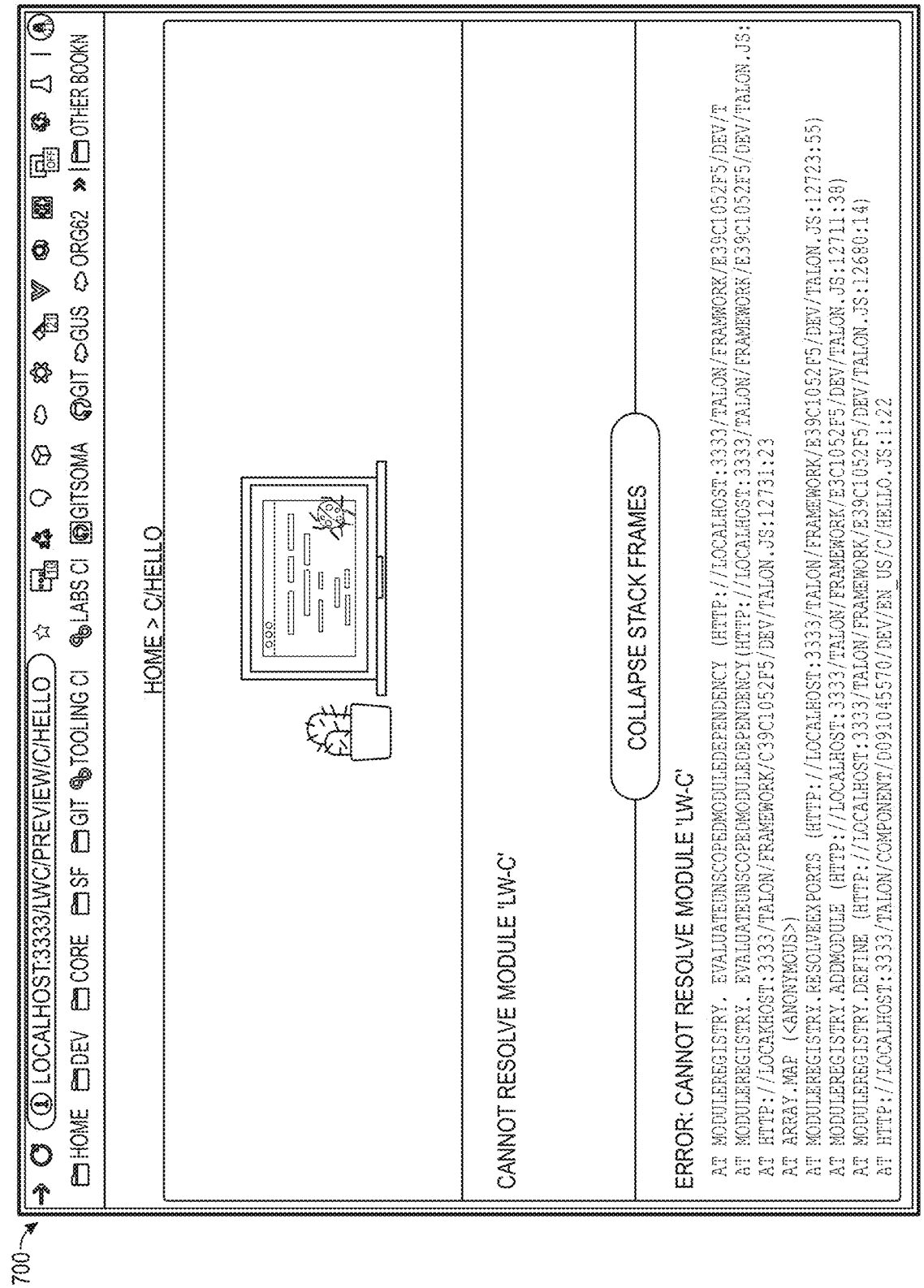
FIG. 7 depicts a component to support the local development server UI in connection with disclosed embodiments.

Yet another such component is Error 254, an example 700 of which is illustrated in FIG. 7. When an error occurs, the local development server 235 displays the underlying compiler or runtime error. This may include line number, filename, a stacktrace, and a snippet of the code context where the error occurred, if available. If a filename and error line is available, a link to open the file/line in VSCode is included using the VSCode protocol handler. If VSCode is not available, this link does nothing. However, the inline source code context should provide sufficient information to see where the problem occurred.

According to embodiments of the invention, regarding the runtime experience, once the local development server 220 is started, the user can navigate to their local server (via, e.g., hypertext transfer protocol (HTTP) requests) to see the list of all their components they have and links to preview those components. Clicking on one of the components loads a new page with that component hosted inside the configured container. File watchers 245 detect changes and initiate recompilations of the components. For performance, according to an embodiment, only changed components are recompiled via caching mechanisms in the UC Runtime 215, as further discussed below.

The steps to render ("Render /") a component list, according to one embodiment, are as follows:
1. Load the route corresponding to /, which returns localdevserver:componentlist.
2. Create and serve the HTML template 211, which includes SLDS, LWC engine, the UC module loader, and routes.
3. Module Loader loads the localdevserver:componentlist view corresponding to the route, and makes a server request for this component.
4. Server detects the localdevserver:componentlist component is not compiled, so compiles, caches, and hashes, it. The compiled component is returned to the module loader.
5. Module loader evaluates and appends the component to the Document Object Module (DOM) for rendering.
6. During rendering, the localdevserver:componentlist makes a fetch( ) call to the server endpoint that returns the component list.
7. Component list is rendered.

The steps to render a custom component list ("Render /preview/c/myCustomComponent"), according to one embodiment, are as follows:
1. Similar to steps 1-7 above, but the localdevserver:preview component dynamically calls into the module loader to load the custom component.

2. The localdevserver:preview appends the returned component into a space in its template that is manually managed <div lwc:dom="manual"> </div>.
3. If there is an error, the error is passed to the localdevserver:error component, which displays and formats the server side exception.
4. localdevserver:preview also uses the livereload NPM, which starts a websocket connection back to the server, listening for reload requests. If the server notices that a file changed, the server sends a message back to the client, and the page is reloaded by live reload host 212.

According to one embodiment, with regard to container types, when previewing a component, a user does so within a container. There are different containers which can show a component in the different contexts in which the user expects the component to be displayed, such as an open source software component container, a simple (default) component container, and a universal container (aka BYOC—bring your own container). These contexts are briefly discussed below.

Open Source Software (OSS) component container. No SLDS is used. No default styling is used, just the user's component, CSS (cascade style sheet), and nothing else.

Simple Component (Default) container. The user's component (and its included component sub-tree) is rendered in isolation. This container may include default Salesforce Assets such as SLDS, a header and some padding to make a more pleasant development experience.

Universal Container(s) (BYOC: Bring your own container). The Universal Container is not just a backend framework, but also a UI runtime. The local development server 235 allows the user to choose in which container to view the component. In actuality, the above mentioned containers are all instances of a Universal Container. If UC creates their own containers, they can be made available here if they align with local development server goals. The customer is offered variations with different capabilities, e.g., mobile, communities, LEX, etc.). Each container has a set of capabilities. The customer can choose the container, configure it, and use it to view their component within the different contexts provided by the different containers (i.e., theme, language, device context, flexipages, or a debugging container to adjust attribute values).

According to embodiments of the invention, with regard to metadata and data, in order to develop components locally, a mechanism is needed to resolve components that require data from a cloud computing services provider's server, community, or org. One embodiment supports this ability by proxying all data requests from the user's local machine to an org that can supply the data needed to render the component.

UC 260 supports proxy data being sent to a configured community's organization. Proxy requests are able to skirt authentication concerns because a community's orgs allow unauthenticated access to a limited subset of entities (which is configurable on a per org basis).

As for authentication, according to an embodiment, for local development scenarios, all API requests (like Apex, LDS/UI API) function against any kind of org. In order to do so, the embodiment authenticates to an org. The SFDX CLI 225 manages the creation of scratch.orgs 275, dev hubs, and capturing the authentication credentials as part of their framework. Since the CLI already has an authentication token 227 to a scratch .org, one embodiment simply retrieves it via the API proxy 270 and appends the authentication token to requests, as depicted in example 800 in FIG. 8.

Regarding the UI API 272, according to one embodiment, UC 260 provides the ability for @wire data requests to send fetch calls to the UI API through the proxy running locally. By attaching the SFDX authentication token, these requests work against any org.

Regarding Apex 271, Apex controllers typically are not exposed through the Representational State Transfer (REST) API by default. Customers add specific annotations to an Apex class to enable Apex REST calls. UC 260 supports Apex 271, and uses a community specific servlet to forward Apex requests to the right Apex controllers. This servlet is not used for local development—it only works for community orgs, according to an embodiment.

Generally speaking, and as discussed in more detail below with reference to FIGS. 9A-9F, embodiments of the invention contemplate a combination of at least some of the following logic components, depending on the embodiment, including logic for resolving a dynamic request from a local web component rendered on a local, off-line, development server (i.e., a development server executing in a stand-alone manner on a user client device) comprising logic for receiving at the local development server, a first request for information from the local web component via a web browser, logic for intercepting the first request at a proxy override module and transmitting the first request to a cloud computing service provider's server, logic for receiving at the local development server a response from the cloud computing service provider's server in reply to the first request, logic for transmitting the response from the local development server to the local web component, logic for storing in a cache located in, or otherwise accessible, to the local development server the response received at the local development server from the cloud computing service provider's server in reply to the first request for information, logic for receiving at the local development server, a subsequent request for the information from the local web component via the web browser, logic for accessing the cache for the response to the subsequent request, and logic for transmitting the response accessed from the cache accessible to the local development server to the local web component. The cache located in, or otherwise accessible to the local development server may be a browser, or other user interface software application, content cache, a software cache such as maintained by an operating system executing on the user client device, or a hardware/CPU cache that caches RAM accesses on the user client device.

Embodiments may further include logic for appending an authentication token to the first request for information, once intercepted, and before transmitting the first request to the cloud computing service provider's server.

Embodiments may further include logic for receiving user input to modify the first request for information, once intercepted, and before forwarding the first request for information, as modified, to the cloud computing service provider's server.

Embodiments may further include logic for receiving user input to modify the response, once received at the local development server from the cloud computing service provider's server, and before transmitting the response, as modified, to the local web component.

Embodiments may further include logic for storing in the cache the first or subsequent request corresponding to the stored response, logic for receiving at the local development server, a second subsequent request for the information from the local web component via the web browser, logic for matching the second subsequent request with the first or subsequent request stored in the cache, logic for retrieving and transmitting the corresponding stored response.

Embodiments may further include logic for editing or modifying the response stored in the cache accessible to the local development server, logic for receiving at the local development server, a subsequent request for the information from the local web component via the web browser, after modifying in the cache the response received at the local development server from the cloud computing service provider's server in reply to the first request, logic for accessing the cache for the modified response to the subsequent request; and logic for transmitting the modified response accessed from the cache accessible to the local development server to the local web component.

Finally, embodiments may further include logic for receiving user input to create a new one or more responses for the information to store in the cache, logic for receiving at the local development server, a subsequent request for the information from the local web component via the web browser, after creating in the cache the new one or more responses for the information, logic for accessing the cache for the new one or more responses for the information, responsive to the subsequent request, and logic for transmitting the new one or more responses accessed from the cache to the local web component.

According to an embodiment 900 of the invention, and with reference to FIG. 9A, locally developed LWC components are rendered on a local server, off-cloud, for example, on the same computing machine via which the developer accesses the development platform via a user interface. Once a component is written using a runtime library, such as Lightning data services, available from Salesforce.com, and rendered locally on the client browser 210 using the local development server 220, there may be a need to dynamically access a community's .org server, on-cloud, for example, to resolve a dynamic request 905 of some kind, such as to resolve a network dependency, or to obtain data from a community's .org in response to a request from the client browser 210. An API proxy 270 in the local development server 235 can communicate with an .org server, e.g., scratch.org 275, (salesforce.org or salesforce.com), to resolve such dynamic requests that otherwise cannot be resolved by the local development server, at 915, 920. In one embodiment, the scratch.org is maintained on, and accessed via, hosted computing environment 111 of host organization 110.

In such an embodiment, the client browser, using LDS 220, makes requests 905, such as HTTP requests, to the local development server 235, which is hosting execution of the component. The local development server 235, in particular, proxy overrides module 255 within UC configuration module 250, receives the requests at 910. In particular, the proxy override module intercepts such requests received from LDS 220 on the client browser 210, and transfers them at 910 to API proxy 270, which forwards those requests at 915 to a cloud computing services provider's server, such as salesforce.org.

In one embodiment 900, with reference to FIG. 9B, an authentication token is optionally added to such a request at 912 so that the request 915 is authenticated. When a response is transmitted back at 920 by the salesforce.org, the same pathways and modules are involved, e.g., the local development server 235 receives at 925 the response at API proxy 270, and transmits it at 930 to the local web component rendered in the client browser 210 via proxy overrides module 255.

Referring to FIG. 9B above, before the proxy services in the local development server send a client browser 210 request to the .org server at 915, or, in the opposite direction of communication, before the proxy services in the local development server provide a response at 930 from the .org server to the client browser 210, the proxy services, according to one embodiment, a user interface (UI) 272 is provided, via API proxy 270, to the developer, by which the developer can optionally provide input at 911 or 926 to modify the data (corresponding requests or responses) before the data is delivered to the target, whether the target is the .org server, or the client browser 210. This is very useful for sending/receiving mock data, or mocked-up information, creating/or avoiding errors, or otherwise testing via test module 205 the locally developed LWC. Once modified, the modified data gets transmitted at 915 to the target, e.g., the .org server or transmitted at 930 to the client browser 210. When a response comes back from the salesforce.com server at 920-925, API proxy 270 can display another UI, optionally, allowing the user to see the response. The user can then modify the response at 926 before it actually gets sent at 930 to the client browser 210.

According to one embodiment, the API proxy 270, upon receiving a request from client browser 210, transmits an instruction to the client browser to display the UI. Doing so essentially suspends the original request back to the client browser 210, waiting for further information. Then, based on the response of from the client browser 210, API proxy 270 will then send the modified request to the scratch.org 275, e.g., salesforce.com. A similar flow of communication happens in reverse: once LDS 235 receives a response from scratch.org 275, API proxy 270 holds the response, transmits an instruction to the client browser 210 to display another UI where the user could can modify the response. After doing so, the browser transmits yet another request with the modified response input by the user at the UI to the API proxy 270. The API proxy then transmits back the modified response in reply to the original request made by the client browser 210.

Figure 9C:
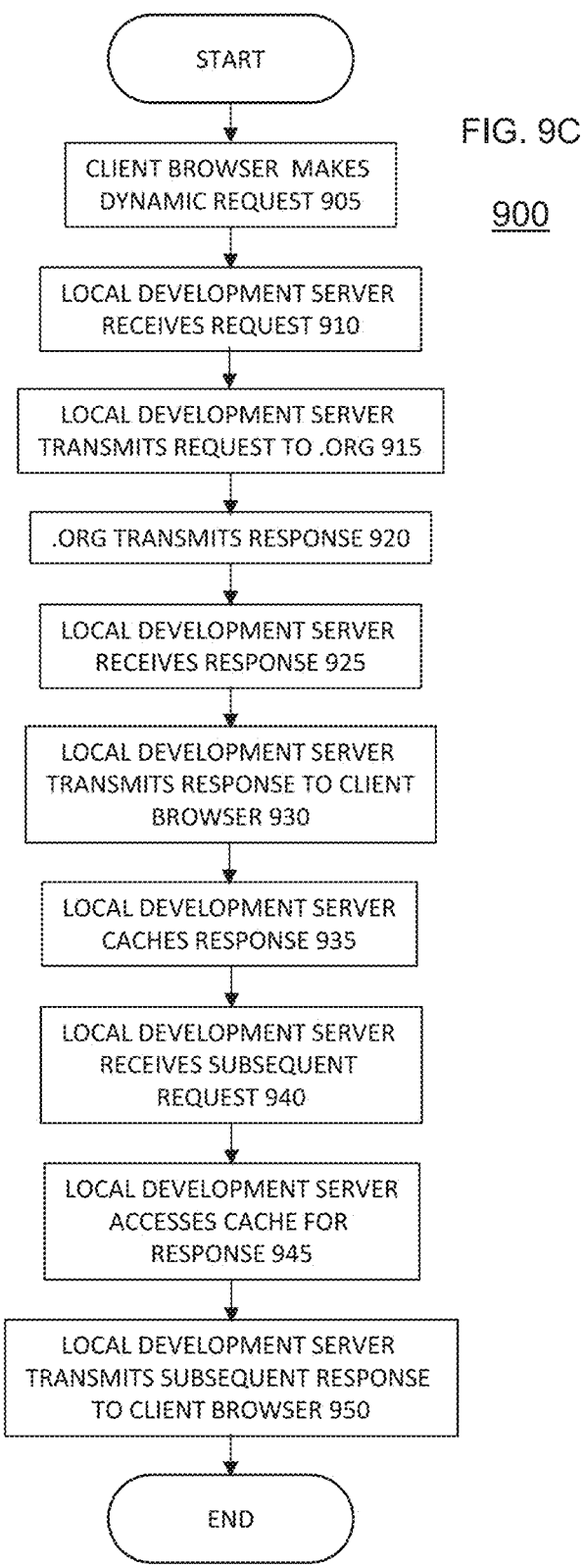
FIG. 9C is a flow diagram depicting operations in accordance with a particular embodiment.

According to one embodiment 900, with reference to FIG. 9C, the request is not actually sent to the scratch.org server; instead, the API proxy 270 actually supplies a response at 950, accessed from the cache at 945, without even communicating with the cloud computing service provider's server. In such an embodiment, there would be no need to obtain and append an authentication token at 912, as depicted with reference to FIG. 9B.

According to one embodiment, with reference to FIG. 9C, proxy data can be used for testing, including recording, playing back, and authoring, data. When the local development server 235 receives data (e.g., a response at 925) from the scratch.org server 275, for example, proxy data in response to a client browser 210 request sent from the local development server to the .org server, the local development server can cache and/or store data locally at 935, so that future client browser requests at 940 do not create the need for further proxy requests.

With reference to FIG. 9E, once the data is stored locally at 935, it can optionally be authored, or changed, by the developer, to suit their needs at 956. This allows for off-line/off-cloud testing of locally developed LWCs, and is useful for not only functional testing of the LWC but also performance testing of the LWC itself, for example, in working with large datasets. In such an embodiment, a request does not even have to be transmitted to the scratch.org server at all; the LDS 235 can supply a user's own modified data at 976, such as previously recorded data or user-authored data. So when the LDS 235 receives a certain request from the client at 960, and detects at 970 that the request 960 is the same as an earlier request 915, the LDS can respond with pre-canned responses at 976, essentially providing a playback function.

Figure 9D:
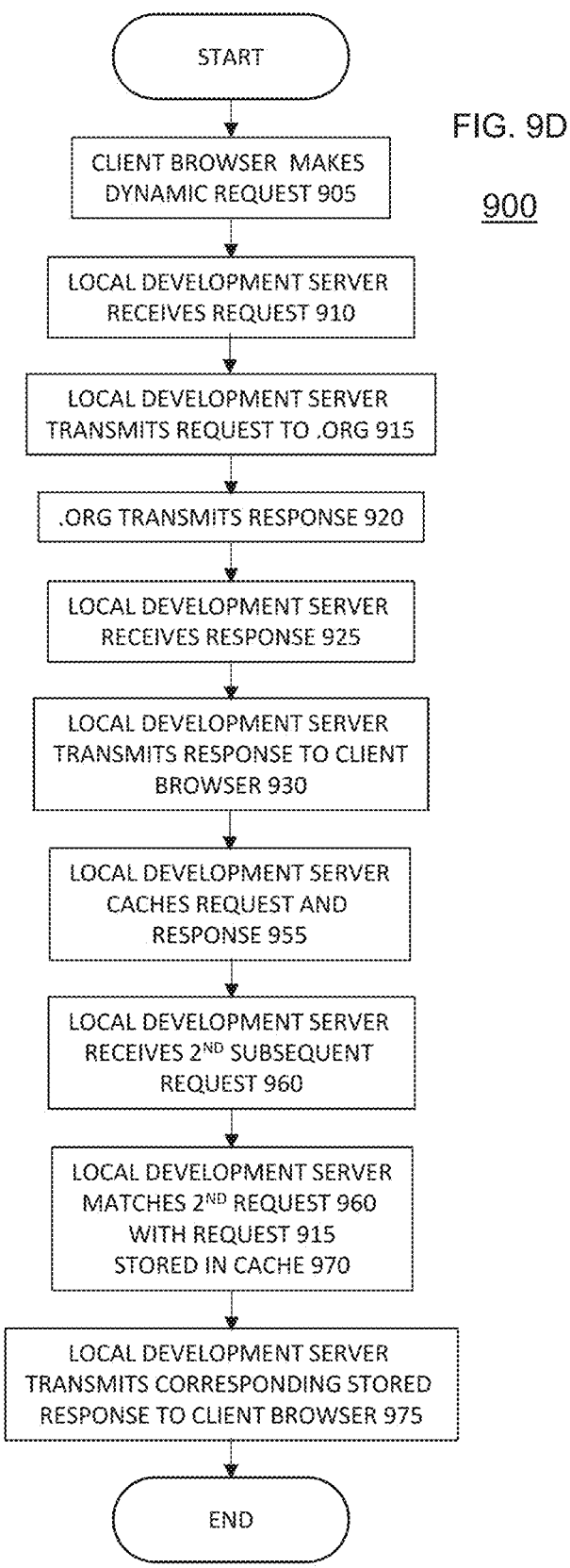
FIG. 9D is a flow diagram depicting operations in accordance with a particular embodiment.

With reference to FIG. 9D, the recording function collects client browser 210 requests forwarded to the Salesforce.com server and the responses transmitted back to the client browser, and records both at 955 into a locally accessible file 280, e.g., a cache. When the LDS 235 receives new requests at 960, it will match at 970 any new request 960 with the previously recorded requests 915, and transmit at 975 a corresponding previously recorded response to the client browser 210, without involving the scratch.org on the cloud computing services provider's server. In such an embodiment, the authentication token inserted at 912 as depicted in FIG. 9B is not needed except when recording where the LDS 235 is communicating with the server back and forth. Once recording is done, and data is stored in a local file, play back only needs access to the locally cached information, e.g., a local file, there is no need to access the scratch.org server anymore. Finally, once the local file is established, the user can actually author directly to the file using any editor 285 the user wants. For example, if the user chose or needed to modify any responses, that can be done directly by editing the local file.

Figure 9F:
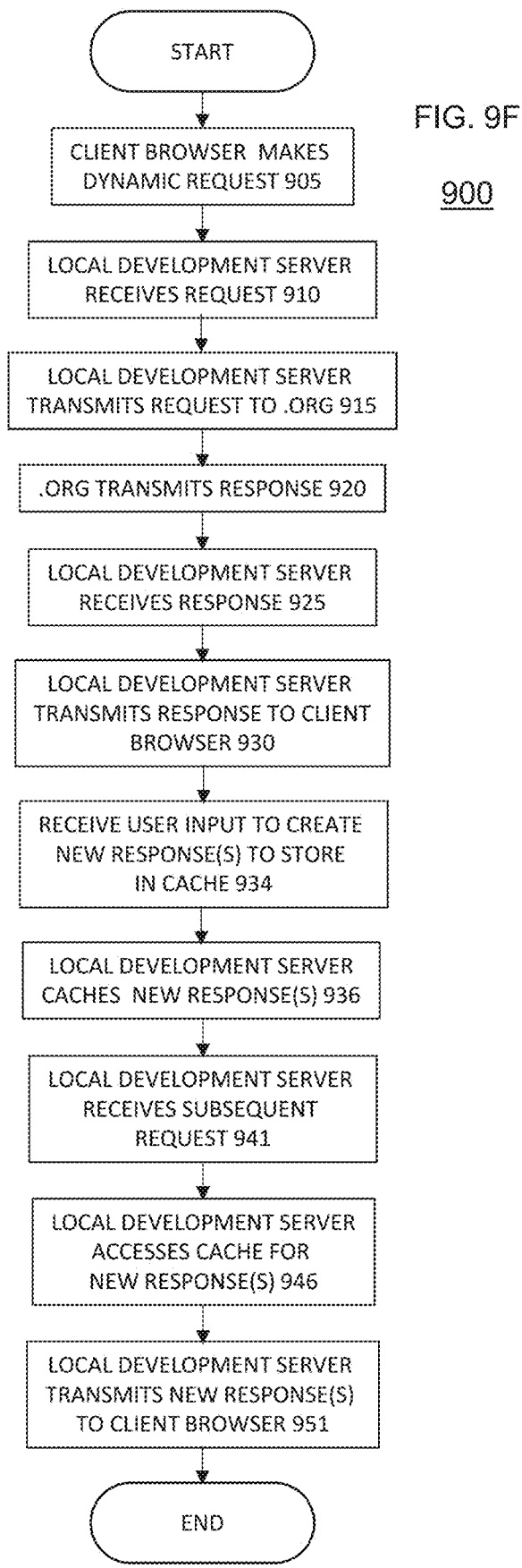
FIG. 9F is a flow diagram depicting operations in accordance with a particular embodiment.

With reference to FIG. 9F, the user can also use the file or cache as a template for creating completely different responses. For example, if the user wanted to come up with a different set of data or perhaps is exercising a different UI, and accessing that UI hard or maybe not even possible, accessing the file allows the user to directly creating a variety of responses, providing a faster iterative development cycle. In such an embodiment, the user creates new responses to store in the file or cache at 934, and the responses are stored in the local development server at 936. When subsequent requests are received at 941, the local development server accesses the file or cache for the new responses at 946 and transmits those new responses to the client browser at 951.

Such an embodiment can also be used in a testing scenario. Once data are recorded to the local file, the data can actually be played back during a test, such as an automated unit test, where a script loads up the component on a server, tries to execute it, and when it executes, its supplies the recorded data. Doing so allows catching errors that may happen as the developer changes code over time.

These embodiments also allow for just in time (JIT) debugging, where all requests and responses are recorded and can be played back. Further, in addition to unit testing, these embodiments allow for performance testing of large data sets.

Embodiments of the invention provide for creation of a template for possible application container services, maintained in a configuration file. A developer can select one or more container services from the template to generate the desired or needed services from the configuration file.

The template in the configuration file contains a list of services that a developer might want to use, such as routing services, settings for a compiler to compile the components that the developer wants to make, run time containers, pop-up runtime message services, console tab services to display navigation in tabs or alternatively a non-single record experience, etc. In short, there are a number of services that make up a run time environment for the client and the server described in the configuration file. A compiler can then compile the configuration file and output an application template, or a scaffolded application container, which can then be hosted and run, and customized further, on any application server.

Thus, with reference to FIG. 10, an embodiment 1000 involves logic 1005 for creating a list of application container services, logic 1010 for maintaining the list in a configuration file, logic 1015 for receiving user input to select one or more the application container services from the configuration file, logic 1020 for compiling the configuration file to generate an application container, responsive to the selected one or more application services, and logic 1025 for executing the generated application container on an application server. An embodiment may further include logic 1030 for receiving user input to modify or customize the generated application container, thereby creating a modified application container, and logic 1035 for executing the modified application container.

Embodiments of the invention further provide a container runtime. According to an embodiment, a local user interface running on the client should be able to render a locally developed LWC in a container runtime, including the back-end framework and UI runtime. The container runtime provides context. A developer may want to test the LWC under various contexts, such as a mobile application environment container, a desktop environment container, a SFDC container, a debug container, etc., for example, to resolve dependencies specific to a particular container or community. A container configuration feature allows the developer to create, modify, and otherwise manage multiple containers to test the locally developed LWC in one or more selected various containers/contexts.

An application container hub on a local development server, according to an embodiment, in addition to providing logic to create, modify, and manage a plurality of application containers on the local development server, further includes a client-side user interface via which a user can select one of the plurality of application containers in the application container hub in which to render a locally developed web component in a container runtime.

The container runtime, depicted on the client at UC Runtime 215 in FIG. 2, provides a framework, that is, a base layer, of all the services that are configured, many of which potentially affect the run time environment in addition to the server. For example, the runtime includes services that run in the browser, e.g., LWC engine 216, the component libraries 217, such as lightning global components, LWC components, the React library, the JavaScript library JQuery, or other frameworks, as well as the runtime side of a history service, a pop-up message service, i.e., all the services that are configured, such as the routing service 218, client service 219 and LDS 220. All the services may affect runtime.

Examples of such containers include containers similar to Salesforce, a mobile container for a mobile environment, a debugging container for a debugging environment, a minimal container, and a container that uses only open source components. In short, a set of containers can be created, each named so that they can easily be reused and shared with other users, via a local development hub or a container hub, such as a Salesforce container hub, in the same or other orgs within Salesforce or even outside of Salesforce. For example, communities might have their own container with a set of services that are specific to it, while others in different communities will have their own container.

Embodiments of the invention provide for dynamically loading and recompiling LWCs. Once the local server is started, the developer can navigate to the local server to see the list of all the components they have and links to preview those components. Clicking on one of the components will load a new page related to that component hosted inside a configured local container. Automatic file watchers will detect changes made by the developer to the components and initiate recompilations of the modified components; only modified components are incrementally recompiled (i.e., only the changes are recompiled).

According to an embodiment, universal container 260 includes an LWC compiler 262. As a developer is developing and changing components, LWC compiler 262 processes the components, and based on the container runtime, includes different additional components that the developer wants. The compiler then generates an actual component that can be run in the browser 210.

In one embodiment, LWC compiler 262 takes changed code in a singular file, as identified by file watchers 245, loads the changed code into the compiler, gathers all the previously compiled assets from a compiler accessible local cache, and compiles the file. In this manner, the compiler produces in the server a file that is the result of all the dependencies for the changed code. Essentially, the compiler performs an incremental compilation, meaning the compiler saves the state of all its previous outputs, and if the developer modifies a particular file, the compiler knows the dependencies relating to that file, and updates downstream modifications.

Incremental compilation involves the compiler saving previously compiled code already in a cache and then bundling the previously compiled code on which the changed code in the singular file has dependencies into one file that is loaded by the browser. The compiler regenerates the entire singular file but it only recompiles the code that actually changed, and the resulting file is an assembly of all of the previously compiled code in addition to the changes to the code in the original file.

Once compilation is completed, the server sends a signal to the browser (live reload host 212) to automatically reload the component in UC runtime 215, so the developer is able to see their changes as they are compiled.

Figure 11:
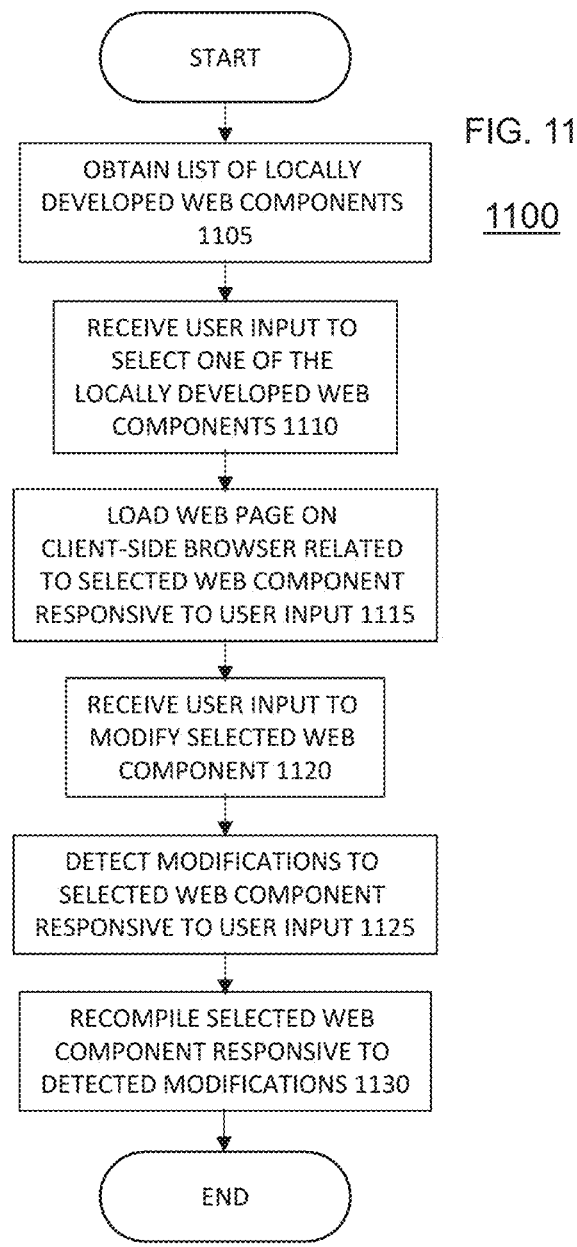
FIG. 11 is a flow diagram depicting operations for dynamically loading and recompiling web components, in accordance with a particular embodiment.

Thus, with reference to FIG. 11, according to one embodiment 1100, logic for dynamically loading and recompiling locally developed web components on a local development server includes logic 1105 for obtaining a list of the plurality of locally developed web components, logic 1110 for receiving user input to select one of the plurality of locally developed web components, logic 1115 for loading a web page on a client-side browser related to the selected one of the plurality of locally developed web components, responsive to the selecting of the one of the plurality of locally developed web components, logic 1120 for receiving user input to modify the selected one of the plurality of locally developed web components, logic 1125 for detecting modifications made to the selected one of the plurality of locally developed web components responsive to receiving the user input, and logic 1130 for recompiling the selected one of the plurality of locally developed web components responsive to detecting the modifications made to the selected one of the plurality of locally developed web components.

Embodiments of the invention provide for setting or changing attributes for a component at development time. At development time, a component may need input to be rendered properly. For example, statistical data types and corresponding values may need to be input so that a bar chart displays properly. The local server also provides a user interface on the browser to allow a developer to change the input just before rendering, allowing for real time update of data.

According to the embodiments, components run in a particular context or container. According to the embodiment, a developer can select whatever container runtime simulation they're planning to use and the server will provide a browser for the developer to input, via the browser, the attributes to be loaded. In one embodiment, a pane is provided that lists all the attributes from which to choose and the developer can enter input, e.g., in the form of strings or numbers or JSON, etc., which the container will parse and then use when it creates the component. In one embodiment, the pane displays a (WYSIWYG) diagram that allows a developer to assign values to keys. This feature is beneficial because it provides very fast real time input. For example, if an input field has a constraint such as a certain value or a complex validation rule for input of a credit card number, this feature allows the developer to quickly type in numbers to test whether the number is treated as valid or not, without having to edit the component to enter a credit card number and save the entered number in the component. Rather, the developer can simply enter the number the UI and see how the component responds.

Thus, with reference to FIG. 12, according to one embodiment 1200, logic for selecting attributes, and providing values related thereto, relating to a locally developed web component at development time in order to properly render the web component, includes logic 1205 for selecting an application container runtime in which to render the locally developed web component, logic 1210 for receiving user input via a web browser user interface just prior to rendering the web component in the application container runtime, the user input to select one or more of the plurality of attributes, logic 1215 for receiving user input via the web browser user interface of a value for each of the selected one or more of the plurality of attributes, and logic 1220 for rendering the web component with the selected attributes and corresponding values responsive to the received user inputs.

Figure 13A:
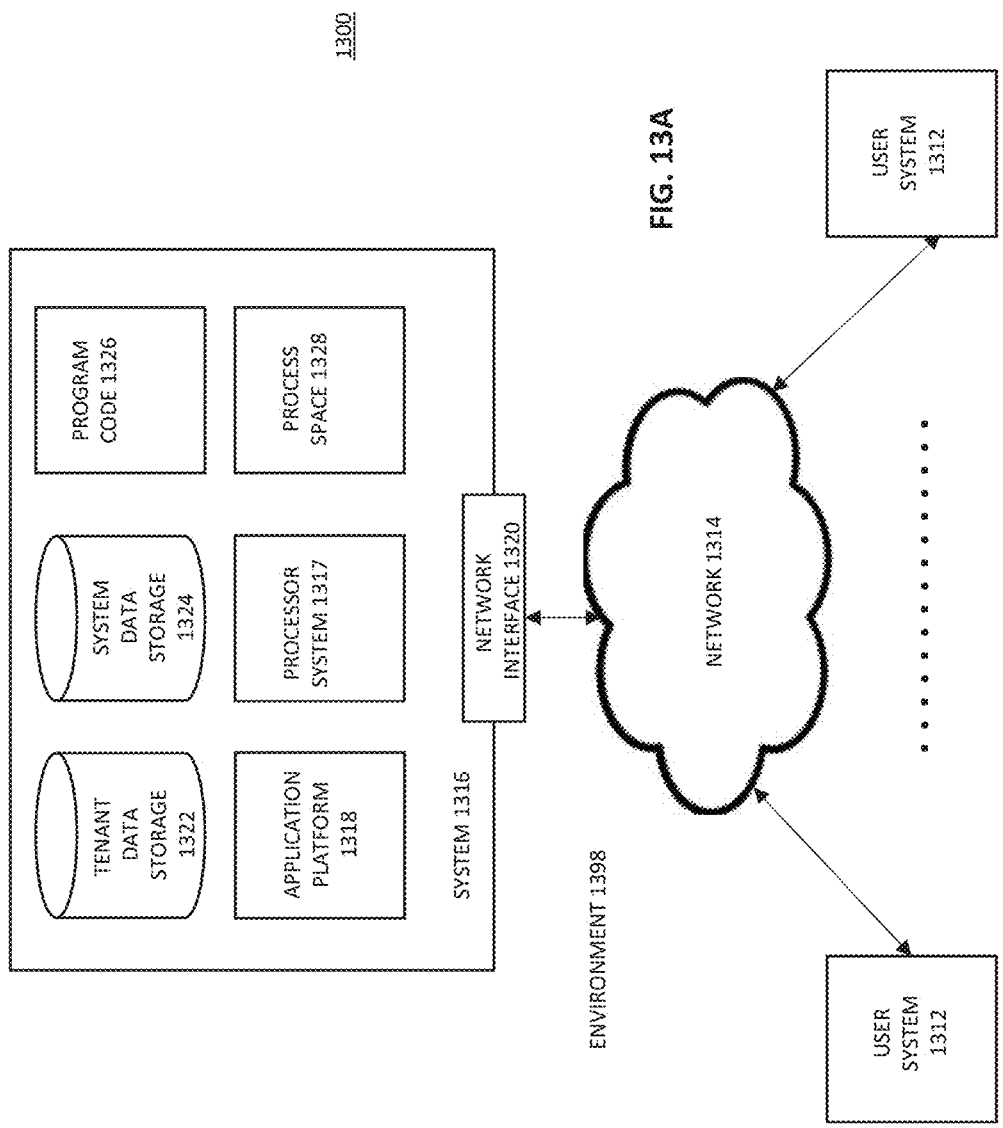
FIGS. 13A and 13B illustrate block diagrams of a computing environment within which the described methodologies may operate in accordance with the described embodiments.

FIG. 13A illustrates a block diagram of an environment 1398 in which an on-demand database service may operate in accordance with the described embodiments. Environment 1398 may include user systems 1312, network 1314, system 1316, processor system 1317, application environment or platform 1318, network interface 1320, tenant data storage 1322, system data storage 1324, program code 1326, and process space 1328. In other embodiments, environment 1398 may not have all of the components listed and/or may have other elements instead of, or in addition to, those listed above.

Environment 1398 is an environment in which an on-demand database service exists. User system 1312 may be any machine or system that is used by a user to access a database user system. For example, any of user systems 1312 can be a handheld computing device, a mobile phone, a laptop computer, a work station, and/or a network of computing devices. As illustrated in FIG. 13A (and in more detail in FIG. 13B) user systems 1312 might interact via a network 1314 with an on-demand database service, which is system 1316.

An on-demand database service, such as system 1316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1316" and "system 1316" is used interchangeably herein. A database image may include one or more database objects. A relational database management system (RDMS) or the equivalent may execute storage and retrieval of information against the database object(s). Application environment 1318 may be a framework that allows the applications of system 1316 to run, such as the hardware and/or software, e.g., the operating system. In an embodiment, on-demand database service 1316 may include an application environment 1318 that enables creation, managing and executing one or more applications developed by the provider of the on-demand database service, users accessing the on-demand database service via user systems 1312, or third party application developers accessing the on-demand database service via user systems 1312.

The users of user systems 1312 may differ in their respective capacities, and the capacity of a particular user system 1312 might be entirely determined by permissions (permission levels) for the current user. For example, where a salesperson is using a particular user system 1312 to interact with system 1316, that user system has the capacities allotted to that salesperson. However, while an administrator is using that user system to interact with system 1316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1314 is any network or combination of networks of devices that communicate with one another. For example, network 1314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 1312 might communicate with system 1316 using TCP/IP and, at a higher network level, use other common Internet protocols to communicate, such as HTTP, FTP, AFS, WAP, etc. In an example where HTTP is used, user system 1312 might include an HTTP client commonly referred to as a "browser" for sending and receiving HTTP messages to and from an HTTP server at system 1316. Such an HTTP server might be implemented as the sole network interface between system 1316 and network 1314, but other techniques might be used as well or instead. In some implementations, the interface between system 1316 and network 1314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1316, shown in FIG. 13A, implements a web-based customer relationship management (CRM) system. For example, in one embodiment, system 1316 includes application servers configured to implement and execute CRM software applications as well as provide related data, code, forms, webpages and other information to and from user systems 1312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1316 implements applications other than, or in addition to, a CRM application. For example, system 1316 may provide tenant access to multiple hosted (standard and custom) applications, including a CRM application. User (or third party developer) applications, which may or may not include CRM, may be supported by the application environment 1318, which manages creation, storage of the applications into one or more database objects and executing of the applications in a virtual machine in the process space of the system 1316.

One arrangement for elements of system 1316 is shown in FIG. 13A, including a network interface 1320, application environment 1318, tenant data storage 1322 for tenant data 1323, system data storage 1324 for system data 1325 accessible to system 1316 and possibly multiple tenants, program code 1326 for implementing various functions of system 1316, and a process space 1328 for executing MTS system processes and tenant-specific processes, such as running applications as part of an application hosting service. Additional processes that may execute on system 1316 include database indexing processes.

Several elements in the system shown in FIG. 13A include conventional, well-known elements that are explained only briefly here. For example, each user system 1312 may include a desktop personal computer, workstation, laptop, PDA, cell phone, or any wireless access protocol (WAP) enabled device or any other computing device capable of interfacing directly or indirectly to the Internet or other network connection. User system 1312 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 1312 to access, process and view information, pages and applications available to it from system 1316 over network 1314. Each user system 1312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1316 or other systems or servers. For example, the user interface device can be used to access data and applications hosted by system 1316, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 1312 and all of its components are operator configurable using applications, such as a browser, including computer code run using a central processing unit such as an Intel Pentium® processor or the like. Similarly, system 1316 (and additional instances of an MTS, where more than one is present) and all of their components might be operator configurable using application(s) including computer code to run using a central processing unit such as processor system 1317, which may include an Intel Pentium® processor or the like, and/or multiple processor units.

According to one embodiment, each system 1316 is configured to provide webpages, forms, applications, data and media content to user (client) systems 1312 to support the access by user systems 1312 as tenants of system 1316. As such, system 1316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 13B:
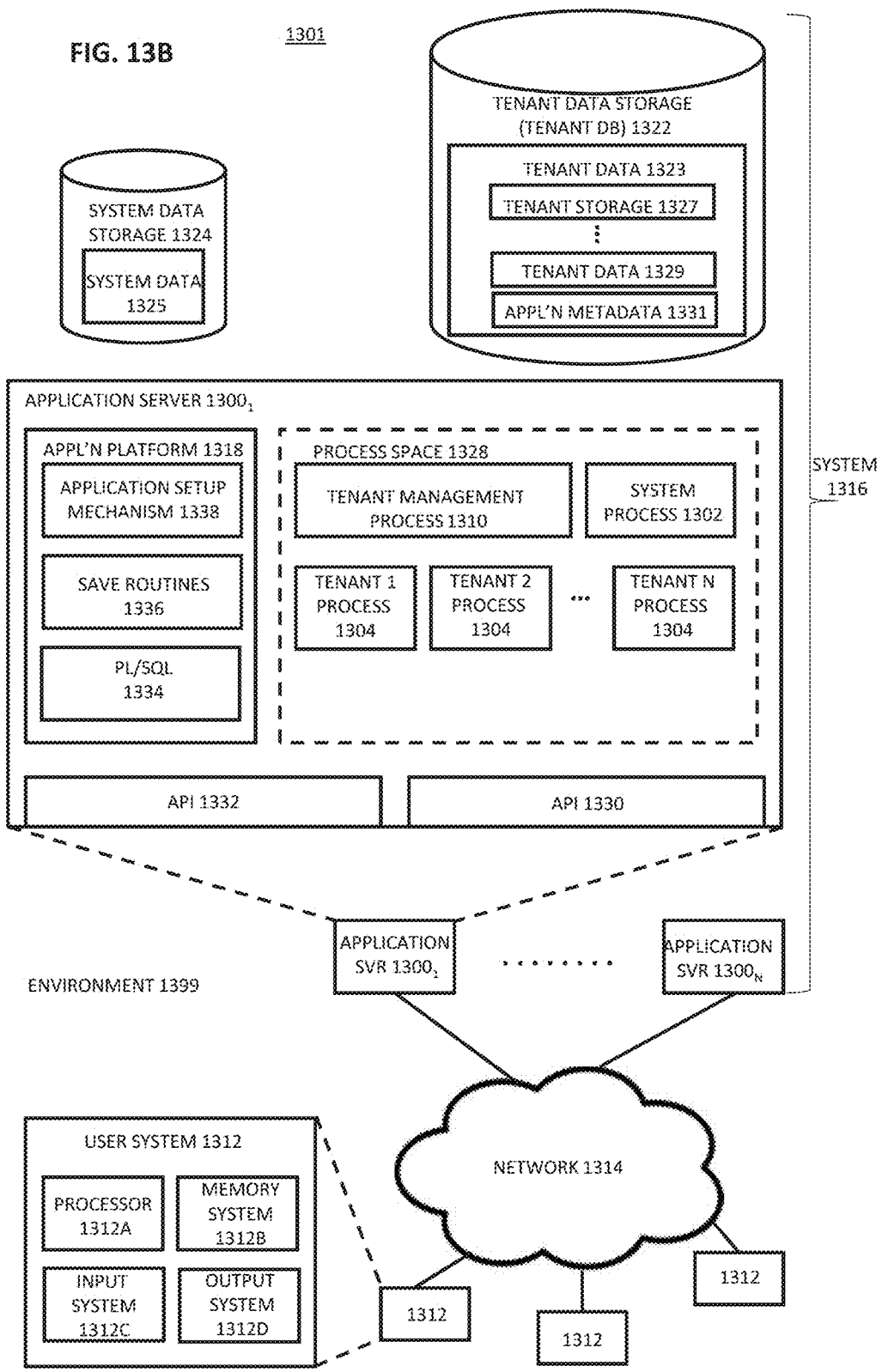

FIG. 13B illustrates another block diagram 1301 of an embodiment of elements of FIG. 13A and various possible interconnections between such elements in accordance with the described embodiments. FIG. 13B also illustrates environment 1399. However, in FIG. 13B, the elements of system 1316 and various interconnections in an embodiment are illustrated in further detail. More particularly, FIG. 13B shows that user system 1312 may include a processor system 1312A, memory system 1312B, input system 1312C, and output system 1312D. FIG. 13B shows network 1314 and system 1316. FIG. 13B also shows that system 1316 may include tenant data storage 1322, having therein tenant data 1323, which includes, for example, tenant storage space 1327, tenant data 1329, and application metadata 1331. System data storage 1324 is depicted as having therein system data 1325. Further depicted within the expanded detail of application servers $1300_{1-N}$ are User Interface (UI) 1330, Application Program Interface (API) 1332, application environment 1318 includes PL/SOQL 1334, save routines 1336, application setup mechanism 1338, process space 1328 includes system process space 1302, tenant 1-N process spaces 1304, and tenant management process space 1310. In other embodiments, environment 1399 may not have the same elements as those listed above and/or may have other elements instead of, or in addition to, those listed above.

User system 1312, network 1314, system 1316, tenant data storage 1322, and system data storage 1324 were discussed above in FIG. 13A. As shown by FIG. 13B, system 1316 may include a network interface 1320 (of FIG. 13A) implemented as a set of HTTP application servers 1300, an application environment 1318, tenant data storage 1322, and system data storage 1324. Also shown is system process space 1302, including individual tenant process spaces 1304 and a tenant management process space 1310. Each application server 1300 may be configured to tenant data storage 1322 and the tenant data 1323 therein, and system data storage 1324 and the system data 1325 therein to serve requests of user systems 1312. The tenant data 1323 might be divided into individual tenant storage areas (e.g., tenant storage space 1327), which can be either a physical arrangement and/or a logical arrangement of data. Within each tenant storage space 1327, tenant data 1329, and application metadata 1331 might be similarly allocated for each user. For example, a copy of a user's most recently used (MRU) items might be stored to tenant data 1329. Similarly, a copy of MRU items for an entire organization that is a tenant might be stored to tenant storage space 1327. A UI 1330 provides a user interface and an API 1332 provides an application programmer interface into system 1316 resident processes to users and/or developers at user systems 1312. The tenant data and the system data may be stored in various databases, such as one or more Oracle™ databases.

Application environment 1318 includes an application setup mechanism 1338 that supports application developers' creation and management of applications, which may be saved as metadata into tenant data storage 1322 by save routines 1336 for execution by subscribers as one or more tenant process spaces 1304 managed by tenant management process space 1310 for example. Invocations to such applications may be coded using PL/SOQL 1334 that provides a programming language style interface extension to API 1332. Invocations to applications may be detected by one or more system processes, which manages retrieving application metadata 1331 for the subscriber making the invocation and executing the metadata as an application in a virtual machine.

Each application server 1300 may be communicably coupled to database systems, e.g., having access to system data 1325 and tenant data 1323, via a different network connection. For example, one application server $1300_1$ might be coupled via the network 1314 (e.g., the Internet), another application server $1300_{N-1}$ might be coupled via a direct network link, and another application server $1300_N$ might be coupled by yet a different network connection. Transfer Control Protocol and Internet Protocol (TCP/IP) are typical protocols for communicating between application servers 1300 and the database system. However, it will be apparent to one skilled in the art that other transport protocols may be used to optimize the system depending on the network interconnect used.

In certain embodiments, each application server 1300 is configured to handle requests for any user associated with any organization that is a tenant. Because it is desirable to be able to add and remove application servers from the server pool at any time for any reason, there is preferably no server affinity for a user and/or organization to a specific application server 1300. In one embodiment, therefore, an interface system implementing a load balancing function (e.g., an F5 Big-IP load balancer) is communicably coupled between the application servers 1300 and the user systems 1312 to distribute requests to the application servers 1300. In one embodiment, the load balancer uses a least connections algorithm to route user requests to the application servers 1300. Other examples of load balancing algorithms, such as round robin and observed response time, also can be used. For example, in certain embodiments, three consecutive requests from the same user may hit three different application servers 1300, and three requests from different users may hit the same application server 1300. In this manner, system 1316 is multi-tenant, in which system 1316 handles storage of, and access to, different objects, data and applications across disparate users and organizations.

As an example of storage, one tenant might be a company that employs a sales force where each salesperson uses system 1316 to manage their sales process. Thus, a user might maintain contact data, leads data, customer follow-up data, performance data, goals and progress data, etc., all applicable to that user's personal sales process (e.g., in tenant data storage 1322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1316 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1316 might also maintain system level data usable by multiple tenants or other data. Such system level data might include industry reports, news, postings, and the like that are sharable among tenants.

In certain embodiments, user systems 1312 (which may be client systems) communicate with application servers 1300 to request and update system-level and tenant-level data from system 1316 that may require sending one or more queries to tenant data storage 1322 and/or system data storage 1324. System 1316 (e.g., an application server 1300 in system 1316) automatically generates one or more SQL statements (e.g., one or more SQL queries) that are designed to access the desired information. System data storage 1324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 14 illustrates a diagrammatic representation of a machine 1400 in the exemplary form of a computer system, in accordance with one embodiment, within which a set of instructions, for causing the machine/computer system 1400 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1400 includes a processor 1402, a main memory 1404 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1418 (e.g., a persistent storage device including hard disk drives and a persistent database and/or a multi-tenant database implementation), which communicate with each other via a bus 1430. Main memory 1404 includes a web services bridge 1424 and a schema interface 1425 and a scratch.org 1423 by which to communicate with another web services environment, retrieve, and parse a schema to identify methods provided by the web service at the other web services environment in accordance with described embodiments. Main memory 1404 and its sub-elements are operable in conjunction with processing logic 1426 and processor 1402 to perform the methodologies discussed herein.

Processor 1402 represents one or more general-purpose processing devices such as a microprocessor, central processing unit, or the like. More particularly, the processor 1402 may be a complex instruction set computing (CISC)

microprocessor, reduced instruction set computing (RISC) microprocessor, very long instruction word (VLIW) microprocessor, processor implementing other instruction sets, or processors implementing a combination of instruction sets. Processor 1402 may also be one or more special-purpose processing devices such as an application specific integrated circuit (ASIC), a field programmable gate array (FPGA), a digital signal processor (DSP), network processor, or the like. Processor 1402 is configured to execute the processing logic 1426 for performing the operations and functionality which is discussed herein.

The computer system 1400 may further include a network interface card 1408. The computer system 1400 also may include a user interface 1410 (such as a video display unit, a liquid crystal display, etc.), an alphanumeric input device 1412 (e.g., a keyboard), a cursor control device 1414 (e.g., a mouse), and a signal generation device 1416 (e.g., an integrated speaker). The computer system 1400 may further include peripheral device 1436 (e.g., wireless or wired communication devices, memory devices, storage devices, audio processing devices, video processing devices, etc.).

The secondary memory 1418 may include a non-transitory machine-readable storage medium or a non-transitory computer readable storage medium or a non-transitory machine-accessible storage medium 1431 on which is stored one or more sets of instructions (e.g., software 1422) embodying any one or more of the methodologies or functions described herein. The software 1422 may also reside, completely or at least partially, within the main memory 1404 and/or within the processor 1402 during execution thereof by the computer system 1400, the main memory 1404 and the processor 1402 also constituting machine-readable storage media. The software 1422 may further be transmitted or received over a network 1420 via the network interface card 1408.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method of resolving a dynamic request from a local web component rendered on a development server executing on a user client device, comprising:
    operating a cache, located in the user client device, accessible to the development server;
    receiving at the development server a first request for information from the local web component via a web browser;
    intercepting the first request at a proxy override module, receiving user input to modify the first request for information, appending an authentication token to the first request for information and transmitting the first request, as modified, to a cloud computing service provider's server;
    receiving at the development server a response from the cloud computing service provider's server in reply to the first request;
    transmitting the response from the development server to the local web component;
    storing in the cache accessible to the development server the response received at the development server from the cloud computing service provider's server in reply to the first request for information;
    receiving at the development server a subsequent request for the information from the local web component via the web browser;
    accessing the response to the subsequent request from the cache; and
    transmitting the response accessed from the cache to the local web component.

2. The method of claim 1, further comprising receiving user input to modify the response, once received at the development server from the cloud computing service provider's server, and before transmitting the response, as modified, to the local web component.

3. The method of claim 1, further comprising:
    storing in the cache accessible to the development server the first or subsequent request corresponding to the stored response;
    receiving at the development server, a second subsequent request for the information from the local web component via the web browser;
    matching the second subsequent request with the first or subsequent request stored in the cache; and
    retrieving and transmitting the corresponding stored response.

4. The method of claim 3, further comprising:
    editing or modifying the response stored in the cache accessible to the development server;
    receiving at the development server, a subsequent request for the information from the local web component via the web browser, after modifying in the cache the response received at the development server from the cloud computing service provider's server in reply to the first request;
    accessing the cache for the modified response to the subsequent request; and
    transmitting the modified response accessed from the cache accessible to the development server to the local web component.

5. The method of claim 1, further comprising receiving user input to create a new one or more responses for the information to store in the cache accessible to the development server;
    receiving at the development server, a subsequent request for the information from the local web component via the web browser, after creating in the cache the new one or more responses for the information;
    accessing the cache for the new one or more responses for the information, responsive to the subsequent request; and
    transmitting the new one or more responses accessed from the cache to the local web component.

6. A system to execute within a host organization, wherein the system comprises:
    a cache located in a user client device that is accessible to a development server executing on the user client device;
    a processor and a memory to execute instructions at the system, the system providing:

logic for resolving a dynamic request from a local web component rendered on the development server, comprising:
  logic for receiving at the development server, a first request for information from the local web component via a web browser;
  logic for intercepting the first request at a proxy override module, receiving user input to modify the first request for information, appending an authentication token to the first rec nest for information and transmitting the first request, as modified to a cloud computing service providers server;
  logic for receiving at the development server a response from the cloud computing service provider's server in reply to the first request;
  logic for transmitting the response from the development server to the local web component;
  logic for storing in the cache accessible to the development server the response received at the development server from the cloud computing service provider's server in reply to the first request for information;
  logic for receiving at the development server, a subsequent request for the information from the local web component via the web browser;
  logic for accessing the response to the subsequent request from the cache; and
  logic for transmitting the response accessed from the cache to the local web component.

7. The system of claim 6, further comprising logic for receiving user input to modify the response, once received at the development server from the cloud computing service provider's server, and before transmitting the response, as modified, to the local web component.

8. The system of claim 6, further comprising:
  logic for storing in the cache accessible to the development server the first or subsequent request corresponding to the stored response;
  logic for receiving at the development server, a second subsequent request for the information from the local web component via the web browser;
  logic for matching the second subsequent request with the first or subsequent request stored in the cache; and
  logic for retrieving and transmitting the corresponding stored response.

9. The system of claim 8, further comprising:
  logic for editing or modifying the response stored in the cache accessible to the development server;
  logic for receiving at the development server, a subsequent request for the information from the local web component via the web browser, after modifying in the cache the response received at the development server from the cloud computing service provider's server in reply to the first request;
  logic for accessing the cache for the modified response to the subsequent request; and
  logic for transmitting the modified response accessed from the cache accessible to the development server to the local web component.

10. The system of claim 6, further comprising logic for receiving user input to create a new one or more responses for the information to store in the cache accessible to the development server;
  logic for receiving at the development server, a subsequent request for the information from the local web component via the web browser, after creating in the cache the new one or more responses for the information;
  logic for accessing the cache for the new one or more responses for the information, responsive to the subsequent request; and
  logic for transmitting the new one or more responses accessed from the cache to the local web component.

11. Non-transitory computer readable storage media having instructions stored thereon that, when executed by a processor of a system, the instructions cause the system to perform operations for resolving a dynamic request from a local web component rendered on a development server executing on a user client device, comprising:
  operating, a cache located in the user client device that is accessible to the development server;
  receiving at the development server, a first request for information from the local web component via a web browser;
  intercepting the first request at a proxy override module, receiving user input to modify the first request for information, appending an authentication token to the first request for information and transmitting the first request, as modified, to a cloud computing service providers server;
  receiving at the development server a response from the cloud computing service providers server in reply to the first request;
  transmitting the response from the development server to the local web component;
  storing in the cache accessible to the development server the response received at the development server from the cloud computing service provider's server in reply to the first request for information;
  receiving at the development server, a subsequent request for the information from the local web component via the web browser;
  accessing the response to the subsequent request from the cache; and
  transmitting the response accessed from the cache to the local web component.

12. The non-transitory computer readable storage media of claim 11, further comprising receiving user input to modify the response, once received at the development server from the cloud computing service provider's server, and before transmitting the response, as modified, to the local web component.

13. The non-transitory computer readable storage media of claim 11, further comprising:
  storing in the cache accessible to the development server the first or subsequent request corresponding to the stored response;
  receiving at the development server, a second subsequent request for the information from the local web component via the web browser;
  matching the second subsequent request with the first or subsequent request stored in the cache; and
  retrieving and transmitting the corresponding stored response.

14. The non-transitory computer readable storage media of claim 13, further comprising:
  editing or modifying the response stored in the cache accessible to the development server;
  receiving at the development server, a subsequent request for the information from the local web component via the web browser, after modifying in the cache the response received at the development server from the cloud computing service provider's server in reply to the first request;

accessing the cache for the modified response to the subsequent request; and transmitting the modified response accessed from the cache accessible to the development server to the local web component.

\* \* \* \* \*